United States Patent
Chen (10) Patent No.: US 9,174,487 B2
(45) Date of Patent: Nov. 3, 2015

(54) BICYCLE REAR WHEEL HUB ASSEMBLY

(75) Inventor: Chun-Hsung Chen, Taichung Hsien (TW)

(73) Assignee: Joy Industrial Co., Ltd., Taichung Hsien (TW)

( * ) Notice: Subject to any disclaimer, the term of this patent is extended or adjusted under 35 U.S.C. 154(b) by 550 days.

(21) Appl. No.: 13/545,219

(22) Filed: Jul. 10, 2012

(65) Prior Publication Data

US 2014/0015308 A1    Jan. 16, 2014

(51) Int. Cl.
  *B60B 27/00* (2006.01)
  *B60B 27/02* (2006.01)

(52) U.S. Cl.
  CPC ......... *B60B 27/023* (2013.01); *B60B 2900/115* (2013.01); *B60B 2900/531* (2013.01); *B60B 2900/541* (2013.01)

(58) Field of Classification Search
  CPC .... B60B 27/00; B60B 27/0005; B60B 27/02; B60B 27/023; B60B 27/04; B60B 27/047
  USPC .................. 301/105.1, 110.5, 110.6; 384/545
  See application file for complete search history.

(56) References Cited

U.S. PATENT DOCUMENTS

| | | | |
|---|---|---|---|
| 8,950,825 B2 * | 2/2015 | Kitamura | 301/110.5 |
| 2007/0200423 A1 * | 8/2007 | Kanehisa et al. | 301/110.5 |
| 2007/0252427 A1 * | 11/2007 | Kanehisa | 301/110.5 |
| 2014/0042799 A1 * | 2/2014 | Chen | 301/110.5 |
| 2014/0070602 A1 * | 3/2014 | Mouri et al. | 301/110.5 |

* cited by examiner

*Primary Examiner* — Jason Bellinger
(74) *Attorney, Agent, or Firm* — Rosenberg, Klein & Lee (57) ABSTRACT

A rear wheel hub assembly includes a sleeve and a first installation portion and a second installation portion are respectively located in the two open ends of the sleeve. A hub is mounted to one end of the sleeve and two bearings are located between the two open ends of the hub and the sleeve. A ratchet socket is mounted to an end of the sleeve and located away from the first positioning portion. Two end members are located on the two open ends of the sleeve and each end member has a body. The two respective bodies of the two end members are respectively engaged with the first and second installation portions. The two end members are replaceable when the axle of different sizes is replaced so as to be connected to the bicycle frame.

8 Claims, 11 Drawing Sheets

BICYCLE REAR WHEEL HUB ASSEMBLY

FIELD OF THE INVENTION

The present invention relates to a rear wheel hub assembly, and more particularly, to two side members on two ends of the sleeve of the hub assembly and the two end members are easily removed to replace the hub.

BACKGROUND OF THE INVENTION

The rear wheel hub is the part that drives the rear wheel. The rider operates the pedals to rotate the chainwheel and the chain, and train drives the ratchet socket of the rear wheel hub. A sleeve extends through the ratchet socket which drives the rear wheel hub and the rear wheel. An axle extends through the sleeve and the size of the axle of the rear wheel hub can be replaced according to the need of the transmission force applied thereto. The two ends of the axle are connected with the bicycle frame so that the design for the sleeve is important for the bicycle.

The conventional rear wheel hub has a sleeve received therein and bearings are mounted to the sleeve and located between the sleeve and the hub. The hub is rotatable relative to the sleeve by the bearings. A ratchet socket is connected to one end of the sleeve and the hub is engaged with the ratchet ring of the ratchet socket. An end member is connected between one end of the sleeve and the hub. The other end member is located between the other end of the sleeve and the ratchet socket. An axle extends through the sleeve and two ends of the axle are connected with the dropouts of the bicycle frame.

The end member that is located away from the ratchet socket can be mounted exteriorly or interiorly.

One of the end members that is installed exteriorly is disclosed in Taiwan Patent Application No. 095108024 and discloses a hub and a freewheel which is connected to the hub and rotatable relative to the hub. One of the hub and the freewheel has an extension which extends radially therefrom and the other one of the hub and the freewheel has a securing member connected thereto. A seal member is secured in the securing member and a part of the seal member is in contact with the extension so as to form a sealing status between the hub and the freewheel.

One of the end members that is installed interiorly is disclosed in Taiwan Patent Application No. 0096200047 and discloses an axle which has a threaded section on the right end thereof. A hub has a passage and is mounted to the left end of the axle. Two bearings are located in two ends of the hub and mounted to the axle so that the hub is rotatable. A toothed ring is connected to the right end of the hub. At least two sockets are mounted to the right end of the axle with a bearing located between the sockets and the axle so that the sockets are rotatable. The socket has a ratchet ring which is installed to the right end of the hub and multiple movable ratchet teeth are located on the periphery of the socket. The ratchet teeth are engaged with the toothed ring. The socket has multiple axial engaging recesses and the sockets are engaged with the engaging recesses so that all of the sockets share a common axis. A right end member has a first threaded hole defined at the end that is located adjacent to the socket. The threaded section of the axle is connected to the first threaded hole and a second threaded hole is defined in the outside of the right end member. A threaded rod has a threaded portion which is threadedly connected to the second threaded hole.

For Taiwan Patent Application No. 095108024, the seal member is located between the one end of hub and the freewheel, and a locking nut is located between the first end of the hub and the first end of the axle. A seal member is located between the locking nut, the axle and the bearing. The second end of the hub and the second end of the axle has a second locking nut, and a second seal member is located between the hub, the locking nut and the bearing.

When removing the end member so as to replace different size of the axle, the locking nuts and the seal members on two ends of the hub have to be removed. However, the seal members are different to uninstalled and easily damaged. The cost will be too high.

For Taiwan Patent Application No. 0096200047, the left end member is connected to one end of the hub and a part of the left end member is located in one end of the axle. The right end member is connected to the other end of the hub and mounted to outside of the other end of the axle. The axle is connected to the first threaded hole of the right end member and a threaded part is connected to the second threaded hole of the right end member. By the different lengths of the engaging recesses, the distance between the axis of the rear wheel rim and the axis of the hub is maintained within a pre-set range. Therefore, when replacing the axle, the tension of the spokes does not need to be further adjusted.

When removing the end member, the right end member has to be first loosened and the left end member is then removed. The replacement of axle is not convenient for the users.

The present invention intends to provide a rear wheel hub assembly which improves the shortcomings of the conventional rear wheel hubs.

SUMMARY OF THE INVENTION

The present invention relates to a rear wheel hub assembly and comprises a sleeve which is a hollow tube with two open ends. A first installation portion and a second installation portion are respectively located in the two open ends of the sleeve. A hub is a hollow cylindrical hub with two open ends and the hub is mounted to one end of the sleeve. Two bearings are located between the two open ends of the hub and the sleeve so that the hub is rotatable relative to the sleeve. A ratchet socket is mounted to an end of the sleeve and located away from the first positioning portion. Two end members are located on the two open ends of the sleeve and each end member has a body. The two respective bodies of the two end members are respectively engaged with the first and second installation portions.

The primary object of the present invention is to provide a rear wheel hub assembly wherein the sleeve has one end connected with an end cap and the other end of the sleeve is connected with a ratchet socket. Two end members are respectively connected to the two ends of the sleeve so as to be connected with the bicycle frame. The end members are easily disengaged from the hub assembly.

Another primary object of the present invention is to provide a rear wheel hub assembly wherein the end members are able to be replaced so as to be cooperated with the axle of different sizes. The sleeve does not need to be replaced. The two end members are directly connected to the two ends of the sleeve without use of tools.

Yet another primary object of the present invention is to provide a rear wheel hub assembly wherein the sleeve does not need to be replaced. The distance from the outside of the end cap to the outside of the ratchet socket is not changed so that the parts have the unique sizes to reduce the cost.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
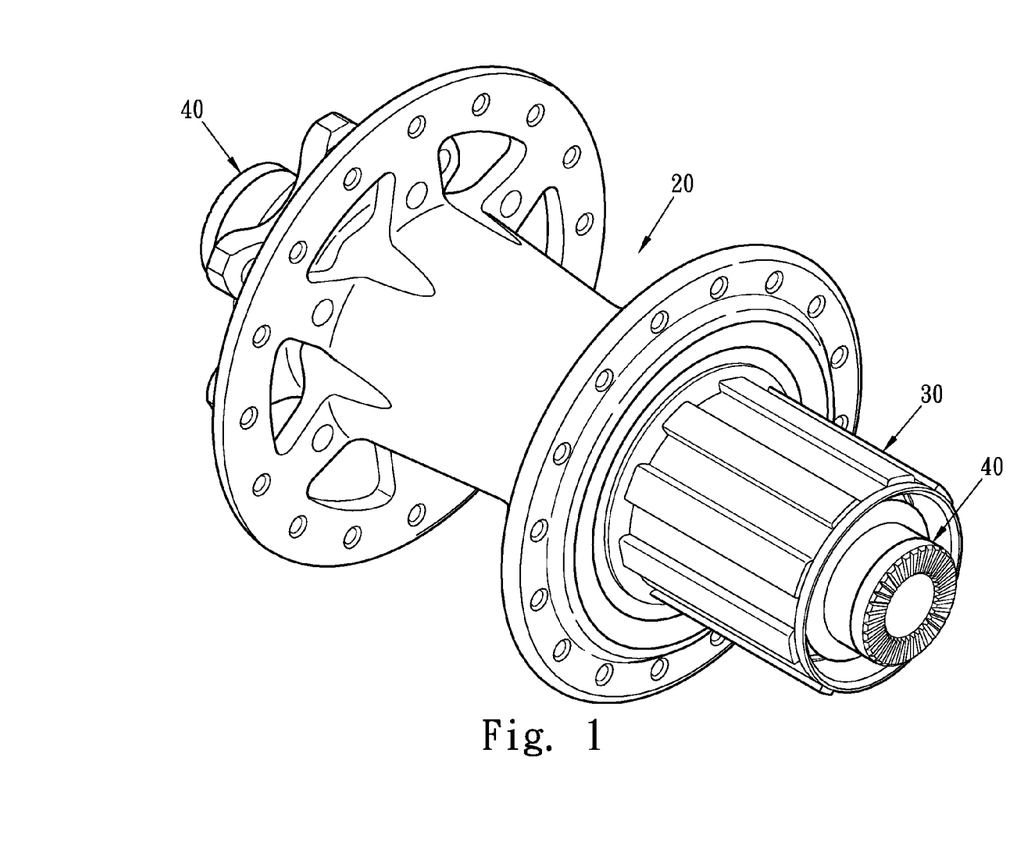
FIG. 1 is a perspective view to show the rear wheel hub assembly of the present invention.
Figure 2:
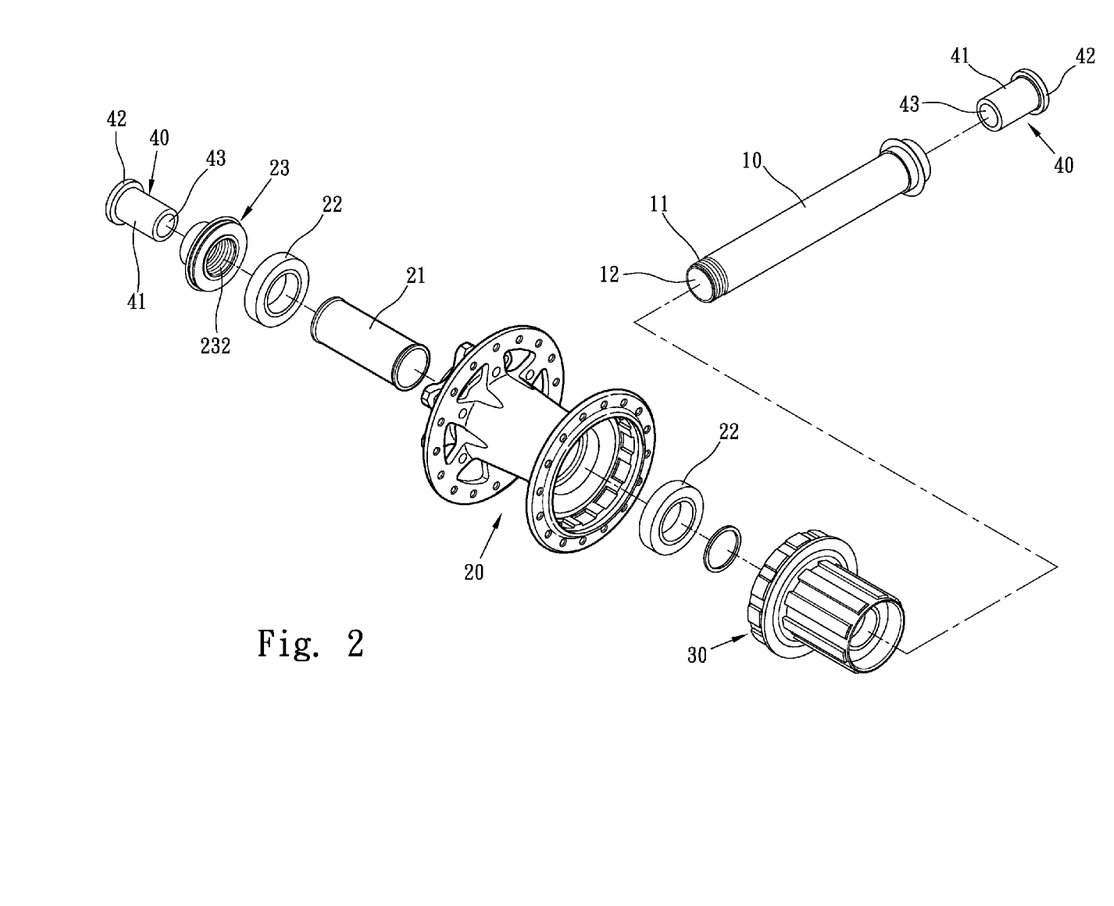
FIG. 2 is an exploded view to show the rear wheel hub assembly of the present invention.
Figure 3:
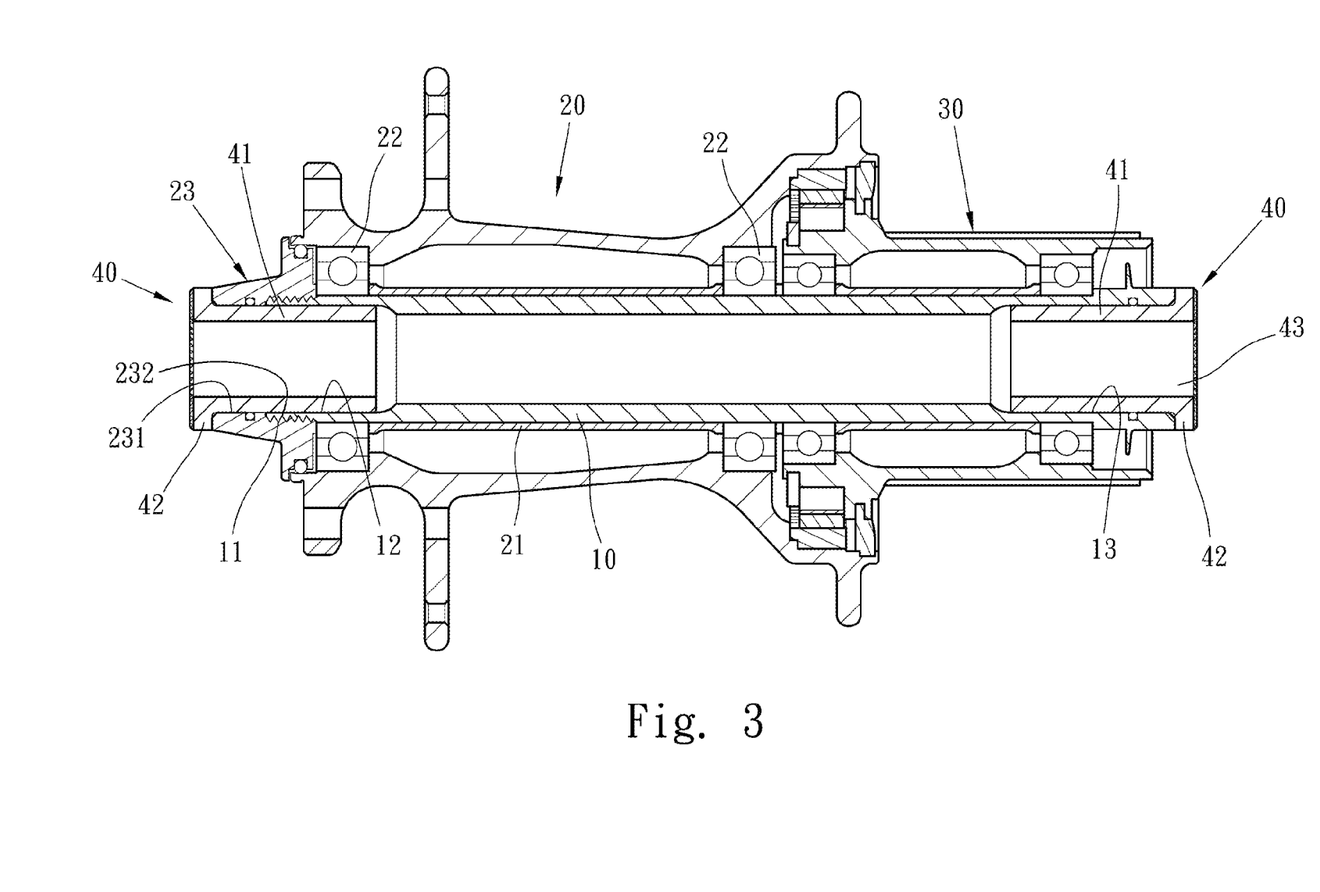
FIG. 3 is a cross sectional view of the rear wheel hub assembly of the present invention.

Referring to FIGS. 1 to 3, the rear wheel hub assembly of the present invention comprises a sleeve 10, a hub 20, a ratchet socket 30 and two end members 40.

The sleeve 10 is a hollow tube with two open ends, a first positioning portion 11 is connected to the outside of one end of the sleeve 10 and has a threaded section. A first installation portion 12 and a second installation portion 13 are respectively located in the two open ends of the sleeve 10. The first installation portion 12 and the second installation portion 13 each are an annular groove defined in the open end of the sleeve 10 corresponding thereto.

The hub 20 is a hollow cylindrical hub with two open ends and the hub is mounted to one end of the sleeve 10. A tube 21 is mounted to the sleeve 10 and located in the hub 20. The hub 20 has two bearings 22 located between two ends of the tube 21 and the sleeve 10. An end cap 23 is connected to one end of the hub 20 and has a through hole 231 which has a second positioning portion 232 located corresponding to the first positioning portion 11. The second positioning portion 232 has a threaded section. The sleeve 10 extends through the through hole 231 and the first positioning portion 11 is threadedly connected to the second positioning portion 232, so that the sleeve 10 is secured. The hub 20 is rotatable relative to the sleeve 10.

The ratchet socket 30 is a hollow cylindrical member with two open ends. The ratchet socket 30 is mounted to one end of the sleeve 10 and located away from the first positioning portion 11. The ratchet socket 30 is located away from the end of the hub 20 that has the end cap 23. The sleeve 10 is partially protrudes beyond the ratchet socket 30. Ratchet mechanism is located between the ratchet socket 30 and the hub 20 so as to drive the hub 20 to rotate in one direction only. A fly wheel is mounted to the ratchet socket 30.

The end members 40 are two identical members and located on the two open ends of the sleeve 10. Each end member 40 has a cylindrical body 41 on one end thereof and a flange 42 extends radially from the other end of the end member 40. The body 41 is located corresponding to the inner diameter of the first installation portion 12, so that the body 41 is installed in the first installation portion 12 and the other body 41 is installed in the second installation portion 13. In this embodiment, the body 41 has a passage 43 defined therethrough which has a pre-set inner diameter so that an axle with larger diameter may extend through the passage 43 and the two ends of the axle are connected with the dropouts of the bicycle frame. The end members 40 may be replaced so as to be connected with different bicycle frames.

The sleeve 10 of the present invention has the first installation portion 12 and the second first installation portion 13 respectively located in the two ends thereof so that the two end members 40 are connected to the first installation portion 12 and the second first installation portion 13 respectively. The distance from the outside of the end cap 23 to the outside of the ratchet socket 30 is not changed so that only the end members 40 need to be replaced and the sleeve 10 does not need to be changed when different axles are used for being connected with different bicycle frames.

When in assembling, the sleeve 10 extends through the hub 20 and the end cap 23 is connected to one end of the sleeve 10 and the body 41 of the end member 40 extends through the end cap 23 and is installed in the first installation portion 12. The flange 42 is located on the outside of the end cap 23. The other end of the sleeve 10 is connected to the ratchet socket 30 and the body 41 of the other end member 40 is installed in the second installation portion 13.

Figure 4:
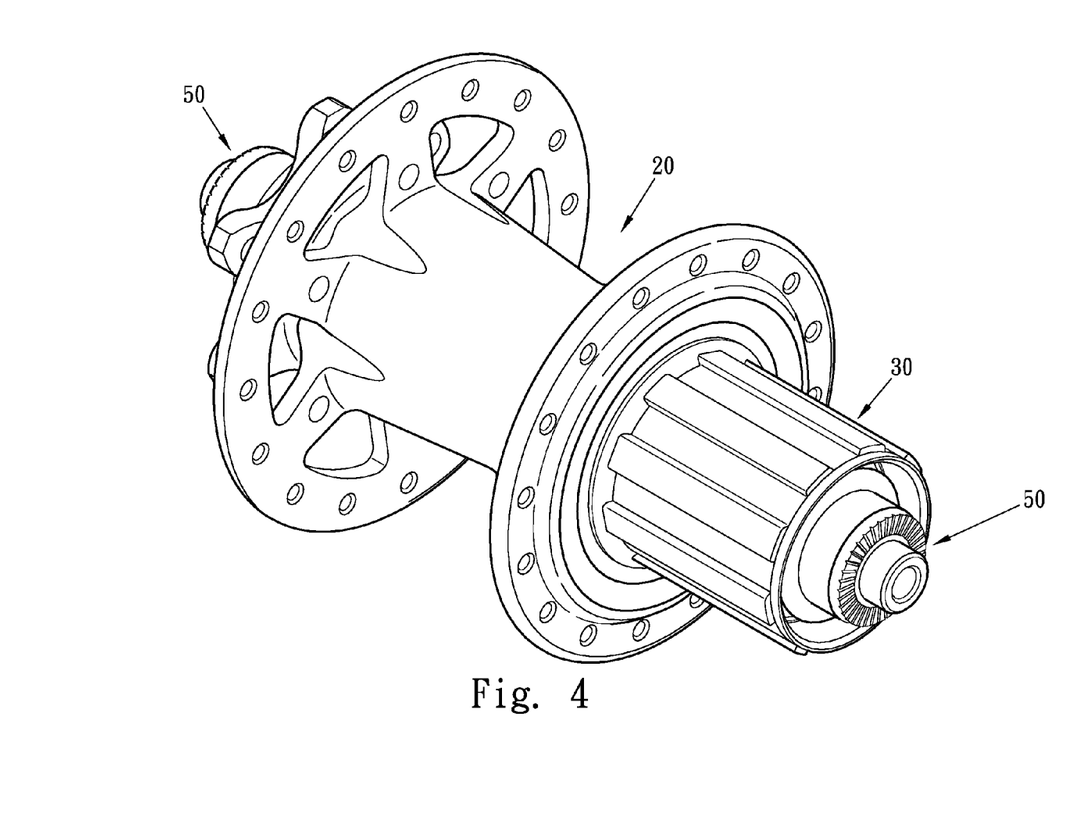
FIG. 4 is a perspective view to show the second embodiment of the rear wheel hub assembly of the present invention.
Figure 5:
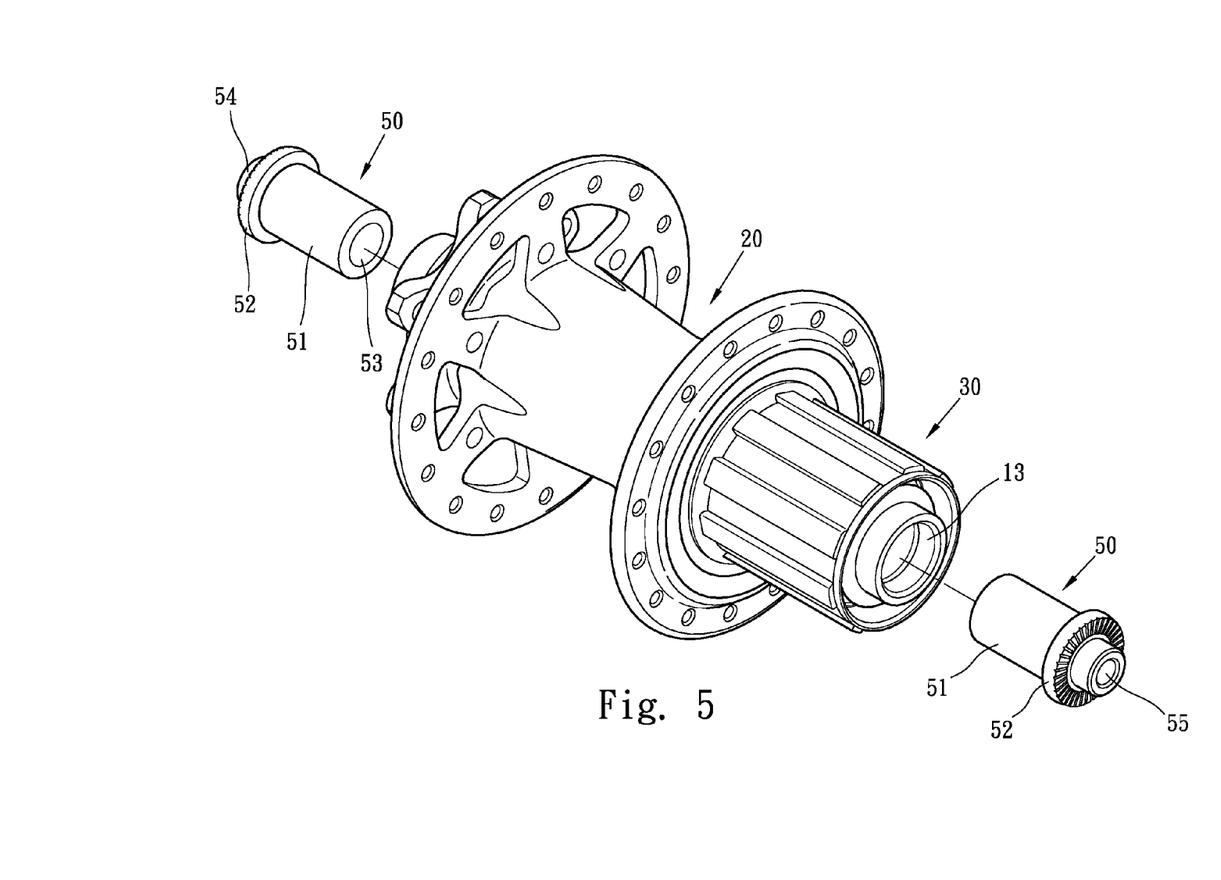
FIG. 5 is an exploded view to show the second embodiment of the rear wheel hub assembly of the present invention.
Figure 6:
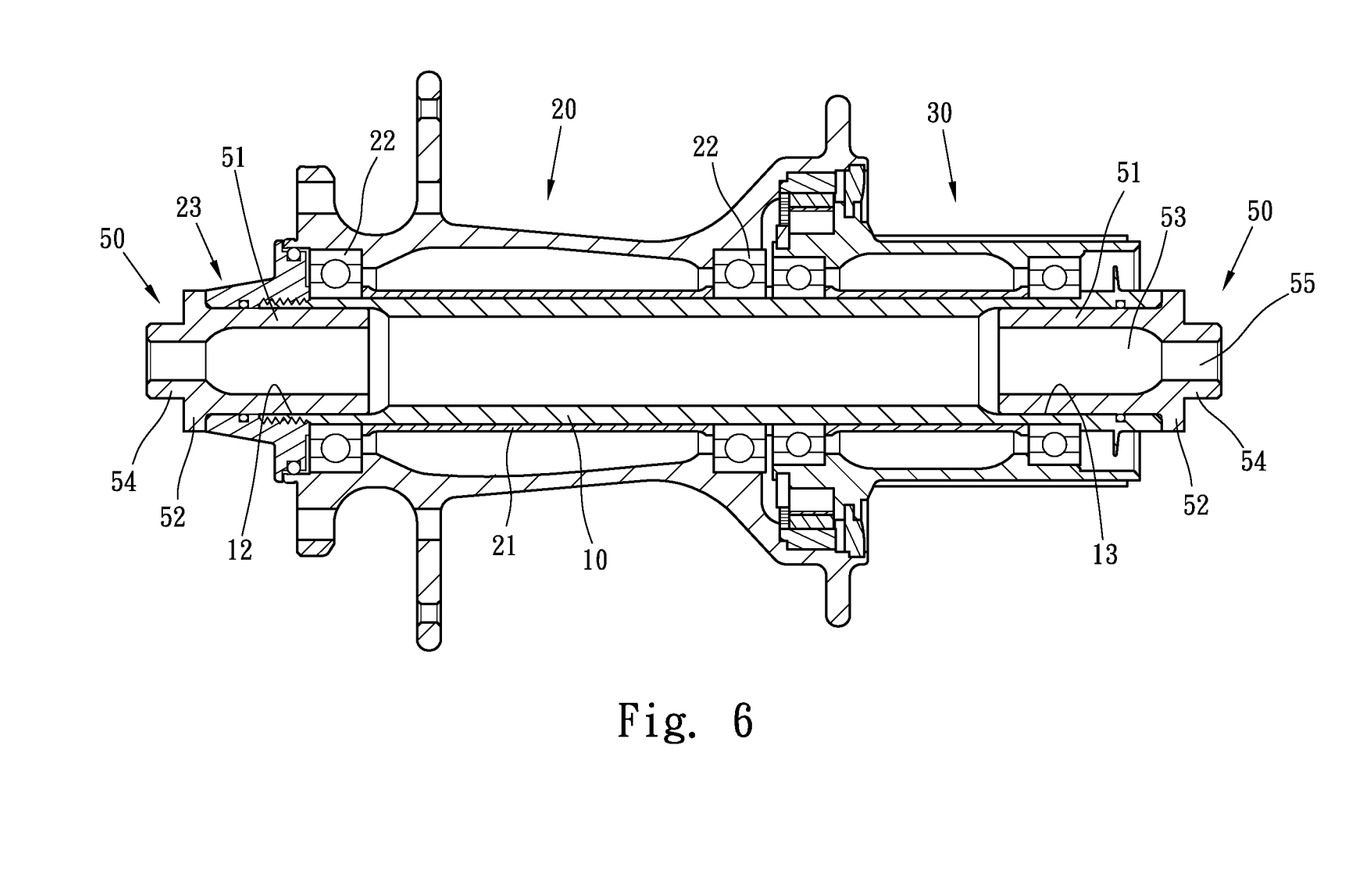
FIG. 6 is a cross sectional view of the second embodiment of the rear wheel hub assembly of the present invention.

As shown in FIGS. 4 to 6, the second embodiment of the present invention is disclosed, wherein the end members 50 are provided. Each of the end members 50 has a cylindrical body 51 on one end thereof and a flange 52 extends radially from the other end of the end member 50. The body 51 is located corresponding to the inner diameter of the first installation portion 12. An extension 54 extends from an end of the flange 52 and located away from the body 51. The outer diameter of the extension 54 is smaller than the outer diameter of the body 51. The body 51 has a passage 53 defined therethrough. The extension 54 has an end hole 55 defined therethrough which communicates with the passage 53. The inner diameter of the end hole 55 is smaller than that of the passage 53. The two respective end members 50 are respectively engaged with the first and second installation portions 12, 13 on two ends of the sleeve 10, so that the quick-release axle with smaller diameter can extend through the end hole 55 and the passage 53. The two ends of the quick-release axle are connected to the dropouts of the mountain bikes, road bikes or leisure bikes.

Figure 7:
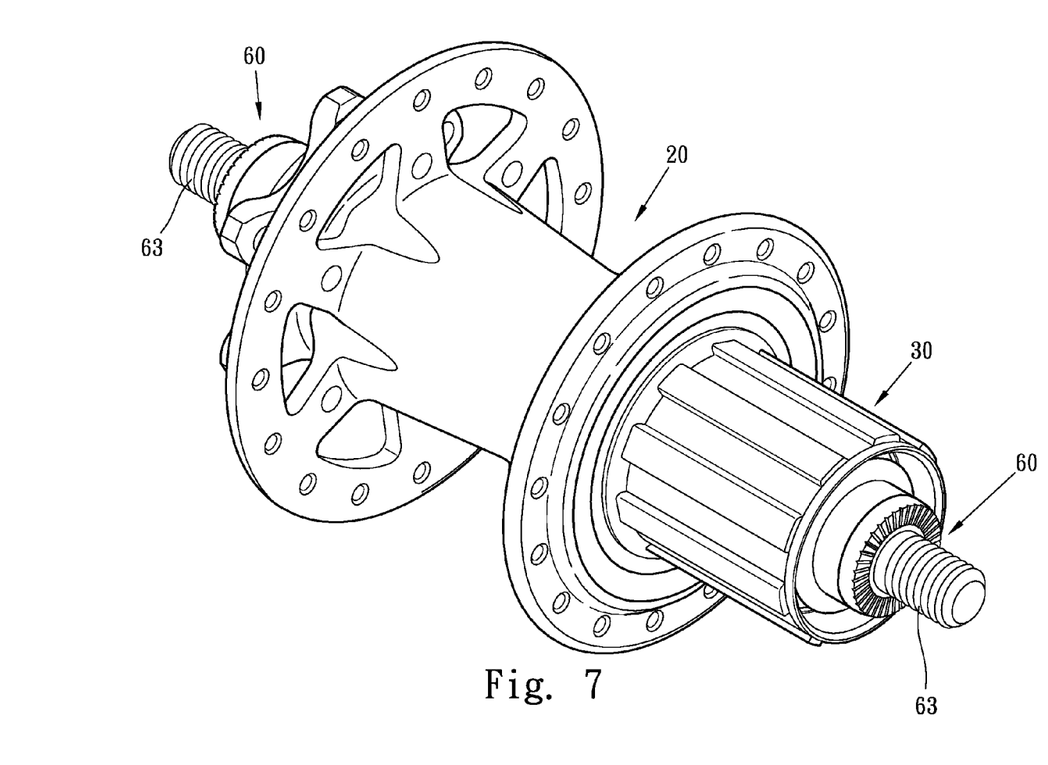
FIG. 7 is a perspective view to show the third embodiment of the rear wheel hub assembly of the present invention.
Figure 8:
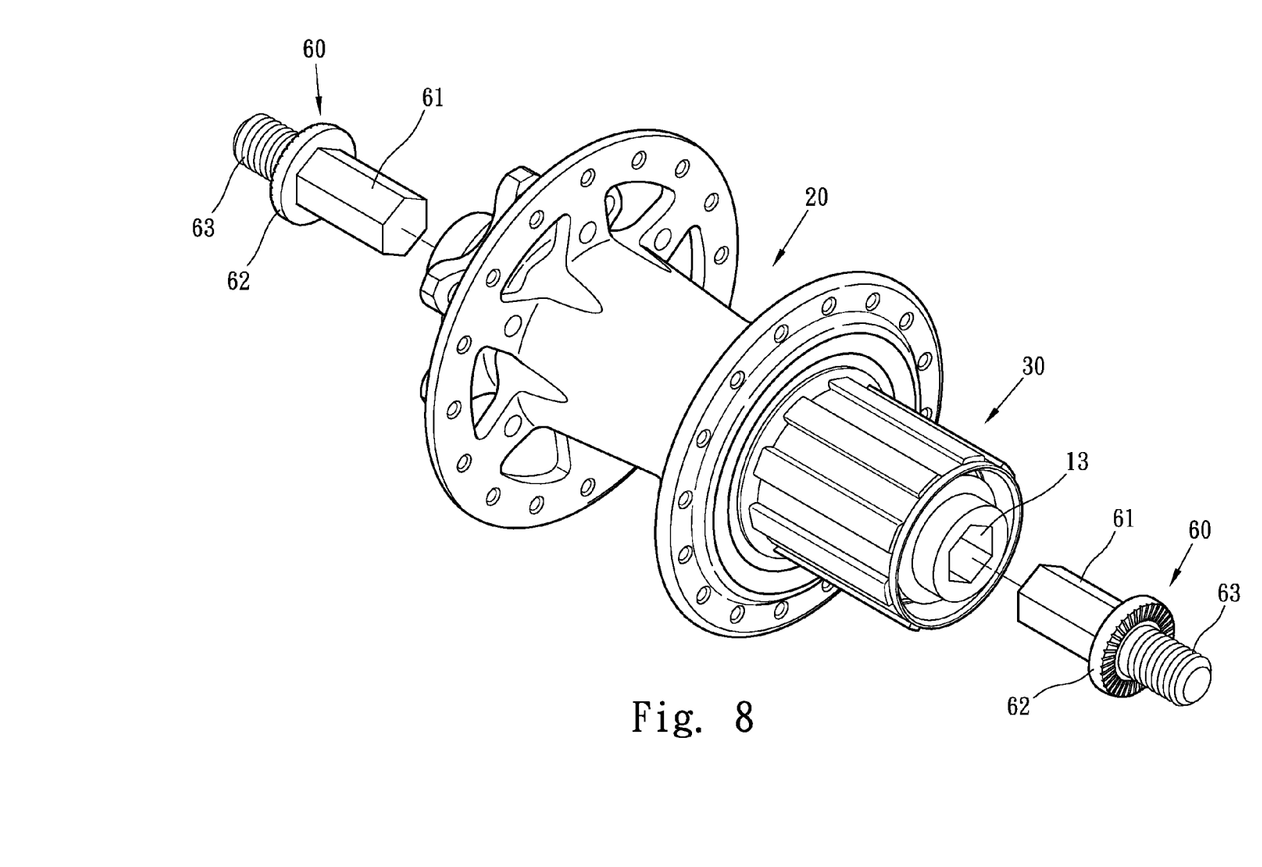
FIG. 8 is an exploded view to show the third embodiment of the rear wheel hub assembly of the present invention.
Figure 9:
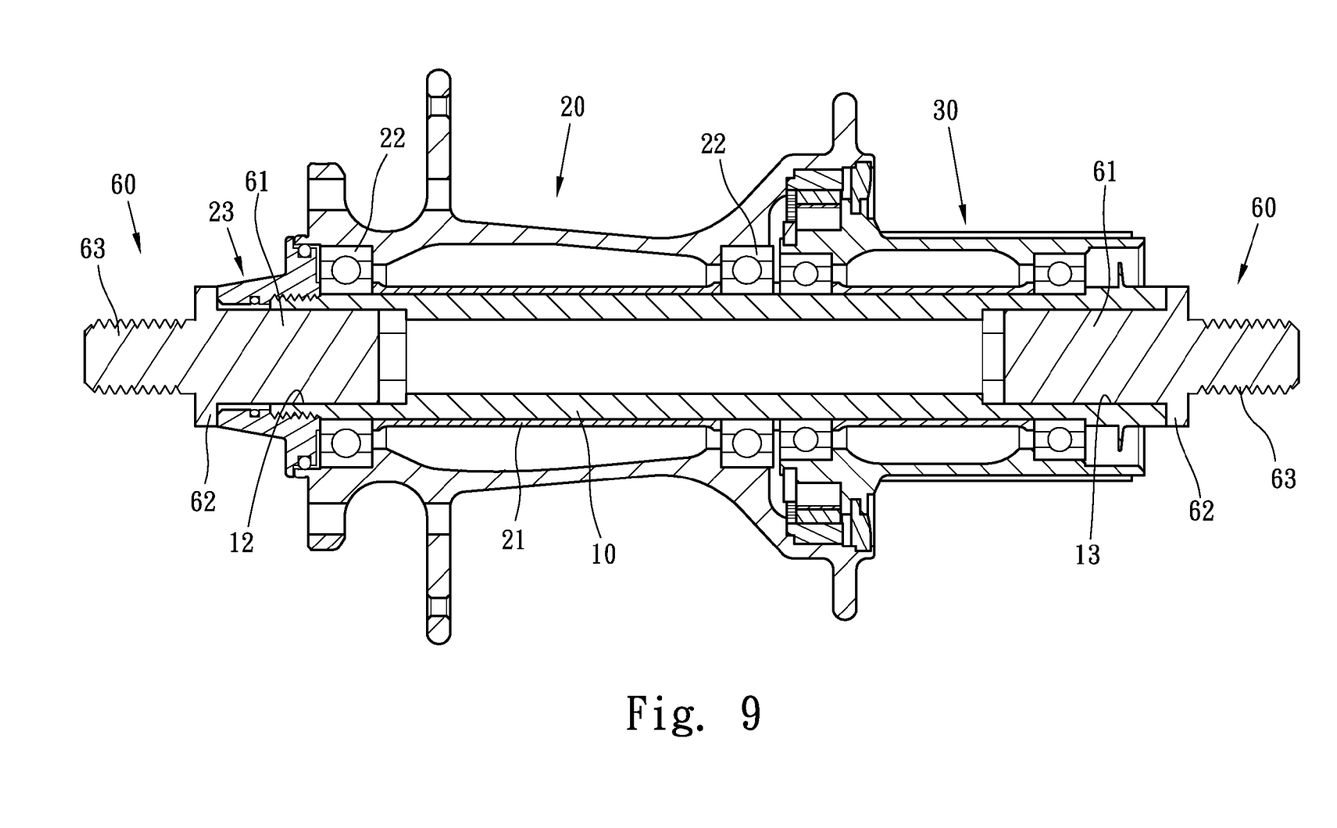
FIG. 9 is a cross sectional view of the third embodiment of the rear wheel hub assembly of the present invention.

As shown in FIGS. 7 to 9, the third embodiment of the present invention is disclosed, wherein the end members 60 are provided. Each of the end members 60 has a cylindrical body 61 on one end thereof and a flange 62 extends radially from the other end of the end member 60. The body 61 is a cylindrical and polygonal body. An extension 63 extends from an end of the flange 62 and located away from the body 61, the extension 63 is a threaded rod. The first and second installation portions 12, 13 each have an annular and polygonal groove which is located corresponding to the body 61. The two respective bodies 61 of the end members 60 are respectively engaged with the first and second installation portions 12, 13 on two ends of the sleeve 10. The extensions 63 are threadedly connected to the bicycle frame.

Figure 10:
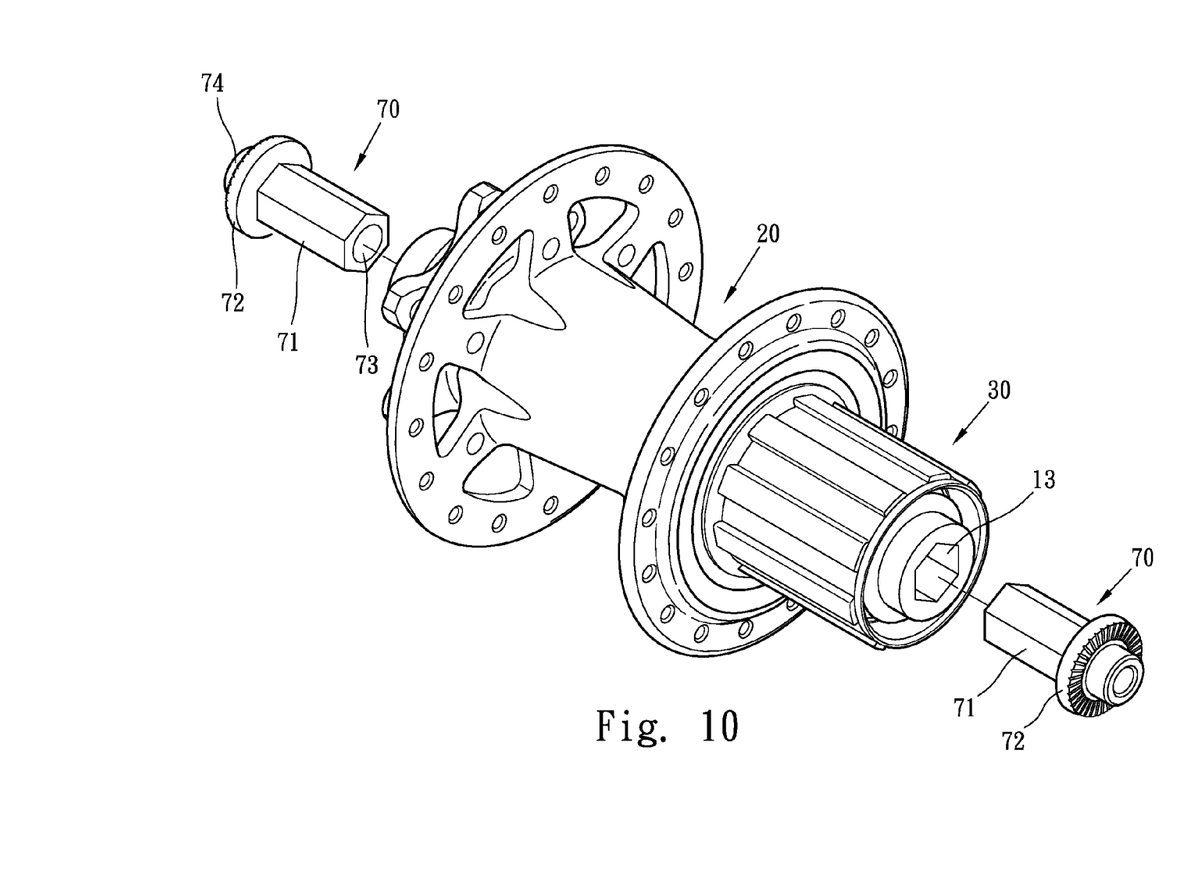
FIG. 10 is an exploded view to show the fourth embodiment of the rear wheel hub assembly of the present invention.
Figure 11:
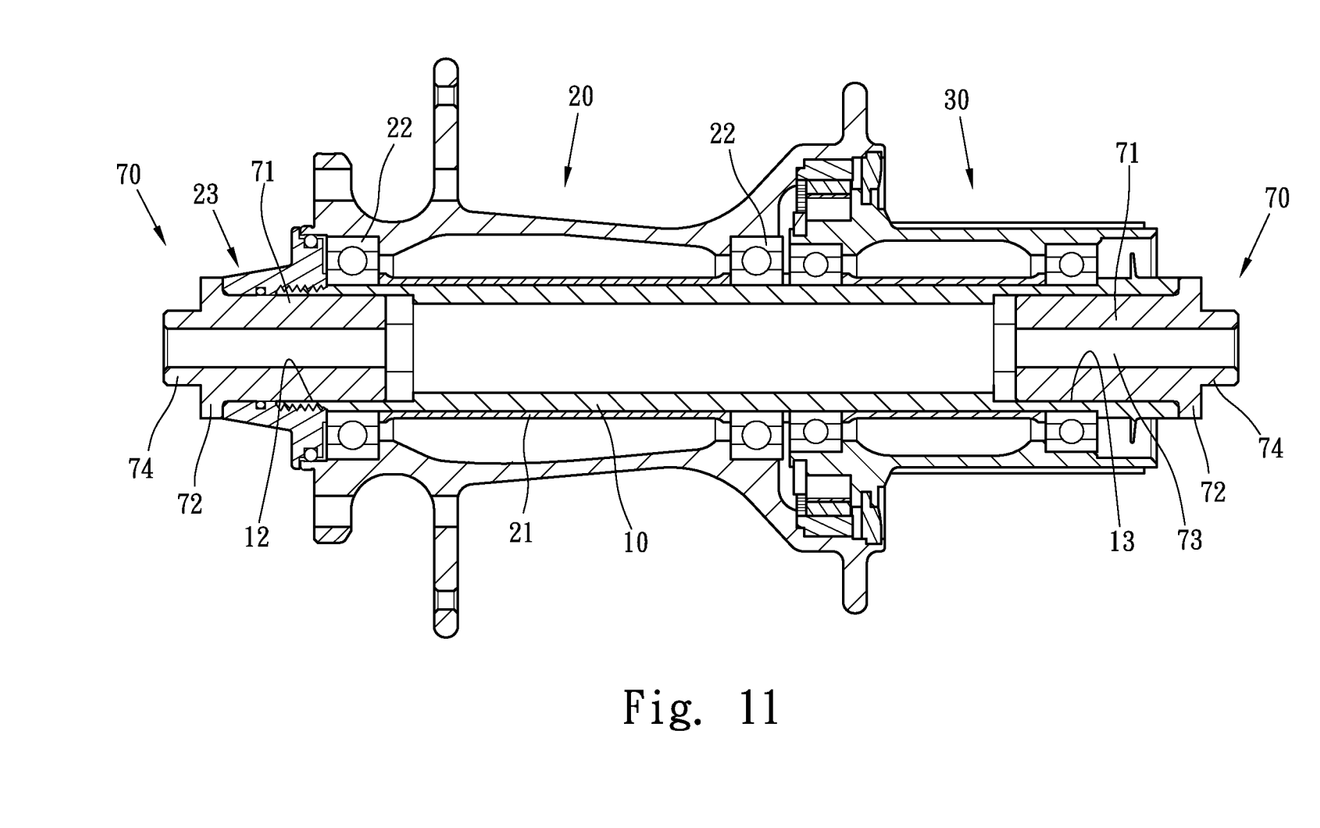
FIG. 11 is a cross sectional view of the fourth embodiment of the rear wheel hub assembly of the present invention.

FIGS. 10 and 11 show the fourth embodiment of the present invention wherein different end members 70 are provided and each of the end members 70 has a body 71 and a flange 72. The body 71 is a polygonal rod and has a passage 73. The flange 72 has one end that is located away from the body 71 has a cylindrical extension 74. The outer diameter of the cylindrical extension 74 is smaller than that of the body 71. The first and second installation portions 12, 13 on the two ends of the shaft 10 each have an annular and polygonal groove which is located corresponding to the body 71. The two respective bodies 71 of the end members 70 are respectively engaged with the first and second installation portions 12, 13 on two ends of the sleeve 10. A quick-release type shaft of smaller diameter extends through the shaft 10 and the passage 73 of the end members 70. By the quick-release device, the shaft can be connected with the dropouts of mountain bikes, road bikes or leisure bikes.

The sleeve 10 of the present invention extends through the hub 20 and one end of the sleeve 10 is connected to the end member 40. The other end of the sleeve 10 is connected to the ratchet socket 30. The sleeve 10 has the first installation portion 12 and the second first installation portion 13 respectively located in the two ends thereof so that the two end members 40 are connected to the first installation portion 12 and the second first installation portion 13 respectively. The axle extends through the two end members 40 and the sleeve 10 so that the bicycle frame is connected to the two ends of the hub 20. The end members 40 are conveniently replaced for different sizes of the axles. The two ends of the axle are connected to the dropouts of the mountain bikes, road bikes or leisure bikes. Only the end members 40 need to be replaced and the sleeve 10 does not need to be changed when different axles are used for being connected with different bicycle frames.

Because the sleeve 10 does not need to be replaced, the distance from the outside of the end cap 23 to the outside of the ratchet socket 30 is not changed so that the sizes of the parts are not changed and this reduces the manufacturing and maintenance cost.

While we have shown and described the embodiment in accordance with the present invention, it should be clear to those skilled in the art that further embodiments may be made without departing from the scope of the present invention.

What is claimed is:

1. A rear wheel hub assembly comprising:
   a sleeve being a hollow tube with two open ends, a first installation portion and a second installation portion respectively axially located at the two open ends of the sleeve;
   a hub being a hollow cylindrical hub with two open ends and the hub mounted to one end of the sleeve, two bearings located between the two open ends of the hub and the sleeve, the hub being rotatable relative to the sleeve;
   a ratchet socket mounted to an end of the sleeve and located axially away from the first installation portion, and two end members located on the two open ends of the sleeve and each end member having a body, the two respective bodies of the two end members respectively engaged with the first and second installation portions.

2. The assembly as claimed in claim 1, wherein the first installation portion and the second installation portion each are an annular recess defined in the open end of the sleeve corresponding thereto.

3. The assembly as claimed in claim 1, wherein a tube is mounted to the sleeve and located in the hub, the hub has the two bearings located between two ends of the tube and the sleeve, an end cap is connected to one end of the hub and the sleeve extends through an axially through-hole of the end cap.

4. The assembly as claimed in claim 1, wherein each of the end members has a cylindrical body on one end thereof and a flange extends radially from the other end of the end member, the body is located corresponding to an inner diameter of the first installation portion, the body has a passage defined therethrough.

5. The assembly as claimed in claim 1, wherein each of the end members has a cylindrical body on one end thereof and a flange extends radially from the other end of the end member, the body is located corresponding to an inner diameter of the first installation portion, an extension extends from an end of the flange and located axially away from the body, the body has a passage defined therethrough, the extension has an end hole defined therethrough which communicates with the passage, an inner diameter of the end hole is smaller than that of the passage.

6. The assembly as claimed in claim 1, wherein each of the end members has a cylindrical body on one end thereof and a flange extends radially from the other end of the end member, the body is a polygonal rod, an extension extends from an end of the flange and located axially away from the body, the extension is a threaded rod, the first and second installation portions each have an annular and polygonal recess which is located corresponding to the body.

7. The assembly as claimed in claim 1, wherein each of the end members has a cylindrical body on one end thereof and a flange extends radially from the other end of the end member, the body is a polygonal rod, an extension extends from an end of the flange and located axially away from the body, the extension is a threaded rod, the first and second installation portions each have an annular and polygonal recess which is located corresponding to the body.

8. The assembly as claimed in claim 1, wherein each of the end members has a cylindrical body on one end thereof and a flange extends radially from the other end of the end member, the body is a polygonal rod and has a passage, an extension extends from an end of the flange and located axially away from the body, the first and second installation portions each have an annular and polygonal recess which is located corresponding to the body.

* * * * *